United States Patent
Baek

(10) Patent No.: US 10,777,816 B2
(45) Date of Patent: Sep. 15, 2020

(54) METHOD FOR PREPARING AN ELECTRODE FOR A SECONDARY BATTERY

(71) Applicant: LG Chem, Ltd., Seoul (KR)

(72) Inventor: Joo Yul Baek, Daejeon (KR)

(73) Assignee: LG Chem, Ltd. (KR)

( * ) Notice: Subject to any disclaimer, the term of this patent is extended or adjusted under 35 U.S.C. 154(b) by 176 days.

(21) Appl. No.: 15/793,061

(22) Filed: Oct. 25, 2017

(65) Prior Publication Data

US 2018/0114986 A1  Apr. 26, 2018

(30) Foreign Application Priority Data

Oct. 26, 2016  (KR) .................. 10-2016-0139813

(51) Int. Cl.
*H01M 4/58* (2010.01)
*H01M 4/133* (2010.01)
*H01M 4/04* (2006.01)
*H01M 4/38* (2006.01)
*H01M 4/139* (2010.01)
*H01M 4/131* (2010.01)
*H01M 4/1391* (2010.01)
*H01M 4/1395* (2010.01)

(52) U.S. Cl.
CPC .......... *H01M 4/58* (2013.01); *H01M 4/0404* (2013.01); *H01M 4/0435* (2013.01); *H01M 4/0471* (2013.01); *H01M 4/131* (2013.01); *H01M 4/133* (2013.01); *H01M 4/139* (2013.01); *H01M 4/1391* (2013.01); *H01M 4/1395* (2013.01); *H01M 4/382* (2013.01)

(58) Field of Classification Search
CPC .......... H01M 4/58; H01M 4/133; H01M 4/04; H01M 4/1395; H01M 4/38
See application file for complete search history.

(56) References Cited

U.S. PATENT DOCUMENTS

| | | | |
|---|---|---|---|
| 6,117,593 A * | 9/2000 | Stachoviak | H01M 4/137 29/623.5 |
| 2007/0212606 A1* | 9/2007 | Chang | H01M 4/1397 429/221 |
| 2011/0274828 A1* | 11/2011 | Nagamatsu | H01M 4/04 427/58 |
| 2012/0115027 A1* | 5/2012 | Uchida | H01M 4/0404 429/209 |
| 2013/0004843 A1* | 1/2013 | Suzuki | H01M 4/13 429/211 |

FOREIGN PATENT DOCUMENTS

| | | |
|---|---|---|
| JP | 2005-285607 A | 10/2005 |
| KR | 10-2010-0071773 A | 6/2010 |
| KR | 10-2016-0039985 A | 4/2016 |

* cited by examiner

*Primary Examiner* — Kenneth J Douyette
(74) *Attorney, Agent, or Firm* — Lerner, David, Littenberg, Krumholz & Mentlik, LLP

(57) ABSTRACT

A method for preparing an electrode for a secondary battery, includes preparing an electrode slurry having an electrode active material and a binder and producing a pre-electrode by coating a first surface of both surfaces of a current collector with the electrode slurry while the first surface is disposed in an upward direction. Additionally, the method includes drying the pre-electrode while the electrode slurry coated on the first surface of the current collector is inverted to be disposed in a downward direction.

11 Claims, 5 Drawing Sheets

METHOD FOR PREPARING AN ELECTRODE FOR A SECONDARY BATTERY

CROSS-REFERENCE TO RELATED APPLICATION

This application claims priority to and the benefit of Korean Patent Application No. 10-2016-0139813 filed on Oct. 26, 2016, the disclosure of which is incorporated herein by reference in its entirety.

TECHNICAL FIELD

The present disclosure relates to a method for preparing an electrode for a secondary battery, and more particularly, to a method for preparing an electrode for a secondary battery having coating of electrode slurry performed on the top of a current collector with respect to the direction of gravity, and drying of the coated electrode slurry while the current collector is inverted to position the coating layer on the bottom surface of the current collector.

RELATED ART

Recently, demands on secondary batteries as an energy source have significantly increased as technologies are developed and demands on mobile devices increase. Among the secondary batteries, lithium secondary batteries, which exhibit high energy density and high operating potential and have a long cycle life and a low self-discharge rate are highly commercialized and widely used. In addition, as environmental concerns increase, significant studies on electric vehicles (EV), hybrid electric vehicles (HEV), etc. capable of replacing fossil-fueled vehicles such as gasoline vehicles and diesel vehicles, which are major contributors to of air pollution have been conducted. In particular, lithium secondary batteries having high energy density, high discharge voltage and high output stability are mainly studied and used as a power source for electric vehicles (EV) and hybrid electric vehicles (HEV).

Accordingly, lithium secondary batteries have been developed to realize high voltage and high capacity in response to demands of consumers. In order to realize the high capacity, a process of optimizing a positive electrode material, a negative electrode material, a separation membrane and an electrolyte, which are four elements of the lithium secondary batteries within a limited space is required. Generally, the easiest way to produce the required high capacity is manufacturing a highly loaded electrode by disposing a large amount of electrode active material on the current collector. However, disposition of the electrode active material in this location may reduce battery performance and stability since separation of electrode may occur during the coating, drying or rolling the electrode when a certain level of electrode adhesion is not secured.

Therefore, studies on a method for improving the electrode adhesion are actively conducted to manufacture a battery having improved performance and stability while realizing the high capacity. Currently, a method of incorporating a binder that improves the electrode adhesion in the electrode is widely used. The electrode active material, the conductive material and the current collector constituting the electrode are solid at room temperature and have different surface characteristics and boding is difficult at room temperature. However, bonding force between the elements of the electrode is increased when a polymeric binder is used. Accordingly, suppression of the phenomenon of separating the electrode in the process of coating, drying and rolling the electrode is possible.

However, when the content of the binder is increased to improve the electrode adhesion, internal resistance of the electrode increases, electron conductivity decreases, and the capacity also decreases. In other words, when the content of the binder is small, the electrode is broken in the charging and discharging process as the adhesion is lowered and the cycle characteristics are deteriorated. Further, as shown in FIG. 1, when the electrode slurry is coated and dried at a high temperature of 70° C. or higher as shown in the conventional electrode preparing method, the binder contained in a slurry state is displaced during the drying process in a direction when the solvent is volatilized (e.g., a direction far from the current collector) due to the temperature condition of the binder of Tg or higher. Therefore, a considerable amount of binder is present on the surface of the electrode and adhesion between the current collector and the electrode mixture is further weakened. Therefore, development of an electrode preparing method capable of improving overall performance of a battery by securing sufficient adhesion with a small amount of binder while having high theoretical capacity is in demand.

The above information disclosed in this section is merely for enhancement of understanding of the background of the disclosure and therefore it may contain information that does not form the prior art that is already known in this country to a person of ordinary skill in the art.

SUMMARY

The present disclosure provides a method for preparing an electrode for a secondary battery. In an aspect of an exemplary embodiment of the present disclosure, a method for preparing an electrode for a secondary battery may include preparing an electrode slurry including an electrode active material and a binder, producing a pre-electrode by coating a first surface of both surfaces of a current collector with the electrode slurry while the first surface is disposed in an upward direction and drying the pre-electrode while the electrode slurry coated on the first surface of the current collector is inverted to be disposed in a downward direction.

In some exemplary embodiments, preparing an electrode for a secondary battery may include coating the electrode slurry on a second surface of the current collector while the electrode in which the electrode slurry coating layer is formed on first surface of the current collector is inverted to face the second surface of the current collector in the upward direction; and drying the electrode while the electrode slurry coated on the second surface of the current collector is inverted to be disposed in the downward.

In another exemplary embodiment, preparing an electrode for a secondary battery may include the electrode slurry having a viscosity of about 5000 to 15000 cP after rotating a Brookfield L-type viscometer for about 1 minute at a temperature of about 25° C. on condition that a rotor number is 64 and a rotational speed is 12 rpm. In some exemplary embodiments, preparing an electrode for a secondary battery may include the coating performed by selecting any one from a group consisting of a die coating method, a slide-slot die coating method, a gravure coating method, a roll coating method, an electrospinning or spraying method and a combination thereof.

Additionally, in some exemplary embodiments, preparing an electrode for a secondary battery may include consecutively producing a pre-electrode and drying the pre-electrode. In other exemplary embodiments, preparing an electrode for a secondary battery may include consecutively coating the electrode slurry and drying the electrode.

In some exemplary embodiments, preparing an electrode for a secondary battery may include drying the pre-electrode includes having a time interval between a time point of inverting the electrode slurry coated on the first surface of the current collector disposed in the downward direction and a time point of beginning the drying is 20 seconds or less. In another exemplary embodiment, preparing an electrode for a secondary battery may include drying the electrode having a time interval between a time point of inverting the electrode slurry coated on the second surface of the current collector disposed in the downward direction and a time point of beginning the drying is 20 seconds or less.

In other exemplary embodiments, the method for preparing an electrode for a secondary battery may include a rolling operation after drying the electrode. In another exemplary embodiment, preparing an electrode for a secondary battery may include a rolling operation after drying the pre-electrode. In some exemplary embodiments, preparing an electrode for a secondary battery may include preforming the drying at a temperature in a range of about 80 to 130° C. for approximately 10 minutes or less.

In another exemplary embodiment, an electrode for a secondary battery prepared by the method disclosed above may further include the content of the binder in a portion adjacent to the current collector greater than content of the binder in a portion apart from the current collector, in an electrode mixture layer formed after drying the coated electrode slurry.

BRIEF DESCRIPTION OF THE DRAWINGS

Exemplary embodiments can be understood in more detail from the following description taken in conjunction with the accompanying drawings, in which.

DETAILED DESCRIPTION

Figure 1:
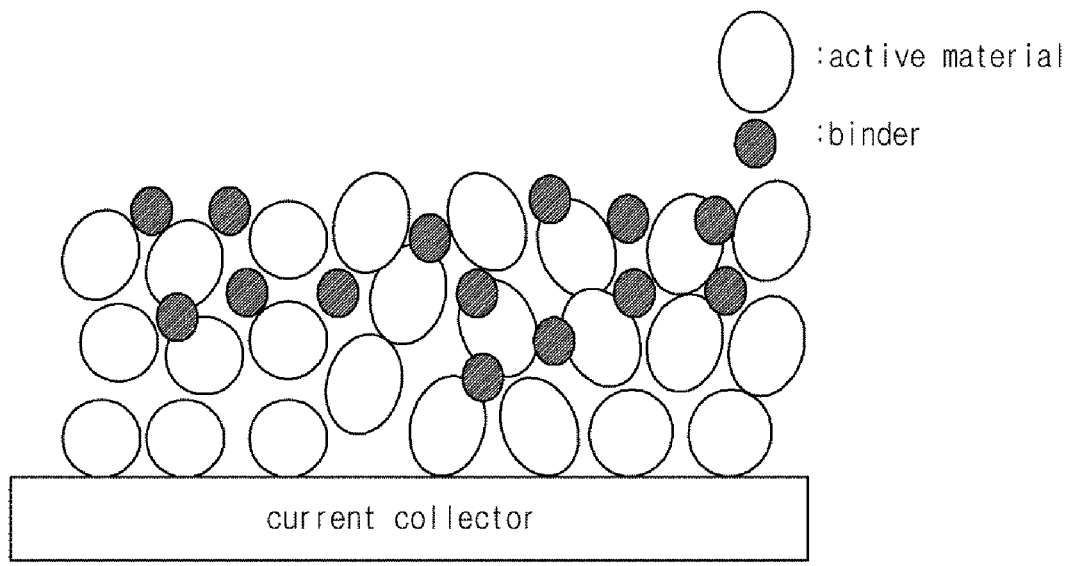
FIG. 1 is an exemplary mimetic diagram showing an electrode for a secondary battery manufactured according to the related art.

Hereinafter, specific embodiments will be described in detail with reference to the accompanying drawings. The present disclosure may, however, be embodied in different forms and should not be construed as limited to the embodiments set forth herein.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure is provided for the purpose of solving the problems of the related art as discussed above and technical problems requested from the past. In particular when the electrode slurry is coated on the top of the current collector and dried while the current collector is inverted to position the coating layer on the bottom surface of the current collector to produce an electrode, the coating may be more easily performed, uniformity of the coated surface may be improved and the binder may be disposed toward the current collector during the drying process. Therefore, an increased amount of binder is present in the vicinity of the current collector as compared with conventional methods. Accordingly, an improved adhesion effect may be obtained even with a small amount of binder (e.g., as compared with conventional amounts of binder required to produce adhesion), thereby completing the present disclosure.

Therefore, the method for preparing an electrode for a secondary battery according to the present disclosure may include preparing an electrode slurry including an electrode active material and a binder, producing a pre-electrode by coating a first surface of a plurality of surfaces (e.g., both surfaces) of a current collector with the electrode slurry while the first surface is disposed in an upward with respect to the direction of gravity and drying the pre-electrode while the electrode slurry coated on the first surface of the current collector is inverted to be disposed downward with respect to the direction of gravity.

In addition, an electrode having the electrode slurry coating a plurality of surfaces (e.g., on both surfaces) of the current collector may be manufactured by coating the electrode slurry on the second surface of the current collector while the electrode in which the electrode slurry coating layer is formed on the first surface of the current collector is inverted to face the second surface of the current collector in an upward direction with respect to the direction of gravity and drying the electrode while the electrode slurry coated on the second surface of the current collector is inverted to be disposed in a downward direction with respect to the direction of gravity. As described above, in the method for preparing an electrode, the electrode slurry may be applied on the top of the current collector with respect to the direction of gravity in the same manner as shown in the conventional method, whereas the drying process may be performed when the electrode slurry-coated layer is inverted to be disposed in a downward direction with respect to the direction of gravity.

In particular, unlike the conventional method in which the relatively light binder among the solid elements in the slurry rises toward the surface of the electrode during the process of drying the electrode, since the current collector exists rather on the upper side with respect to the direction of gravity and the binder may move toward the current collector. Accordingly, a considerable amount of binder may exist in the vicinity of the current collector and the adhesion between the current collector and the electrode mixture layer may be improved with a small amount of binder (e.g., as compared with conventional amounts of binder required). Furthermore, when the coating of the electrode slurry is performed on the top surface of the current collector, the coating process may be more easily and uniformly performed without separating the electrode slurry.

Furthermore, after drying the electrode slurry may be positioned on the bottom of the current collector with respect to the direction of gravity. Therefore, separating the electrode slurry due to the gravity may occur which may cause difficulties in the processing or waste of material. Thus, the electrode slurry according to the present disclosure may be required to have a sufficient viscosity to prevent separation from the current collector even by the gravity for a predetermined time. More specifically, viscosity may be measured after rotating a Brookfield L-type viscometer for 1 minute at a temperature of 25° C. on condition that the rotor number is 64 and the rotational speed is 12 rpm may be 3000 to 30000 cP, and more specifically 5000 to 15000 cP.

When the viscosity is less than 3000 cP out of the range, the electrode slurry may be separated during the process of inverting the current collector for drying, which is not preferable from the viewpoint of processability and economic efficiency. When the viscosity exceeds 30000 cP, the viscosity is too high. Therefore, application of the electrode slurry is difficult and the uniformly forming the coated surface is difficult.

Further, even though the electrode slurry according to the present disclosure has a predetermined viscosity within the above range, when the dying time extended the electrode slurry while the current collector coated with the electrode slurry is inverted, separation of the electrode slurry due to the gravity may occur. Therefore, it is preferable that the producing a pre-electrode and drying the pre-electrode and/or coating the electrode slurry and drying the electrode are performed consecutively. Herein, the expression of 'being performed consecutively' means that all the steps are performed in a series of processes, for example, it means that if the drying process is performed as soon as the coating process is completed, it is a case in which the drying process is consecutively performed starting from a portion coated first while the coating process is progressed (see FIG. 3), etc.

More specifically, during drying of the pre-electrode a time interval between a time point of inverting the electrode slurry coated on the first surface of the current collector to face downward with respect to the direction of gravity and a time point of beginning the drying and/or a time interval between a time point of inverting the electrode slurry coated on the second surface of the current collector to face downward with respect to the direction of gravity and a time point of beginning the drying are about 20 seconds or less, and specifically, it is more effective to perform the drying within approximately 10 seconds.

When the interval is out of the above range and exceeds 20 seconds, the electrode slurry may flow down, which is not preferable. Further, during producing a pre-electrode and drying the pre-electrode and/or coating the electrode slurry and drying the electrode, a time required for inverting the current collector so that the electrode slurry faces downward with respect to the direction of gravity may be about 20 seconds or less, more specifically about 10 seconds or less. When the time interval exceeds 20 seconds to complete the process, the coating process may be excessively long, which is not preferable. Further, the coating method is not particularly limited. The coating may be performed by a die coating method, a slide-slot die coating method, a gravure coating method, a roll coating method, an electrospinning or spraying method or a combination thereof, which are known in the prior art, more specifically, by a gravure coating method or a die coating method.

The drying may include a process for completely volatilizing solvent from the electrode slurry to completely harden the slurry, and may be performed under similar conditions as that of the conventional drying process, for example, at a temperature in a range of about 60 to 150° C. for 1 hour or less, more specifically at a temperature in a range of about 80 to 130° C. for 10 minutes or less.

In addition, the method for preparing an electrode according to the present disclosure may further include a rolling step after drying the pre-electrode and/or drying the electrode. In particular, since electrode density may vary based on rolling strength, the rolling strength may be set appropriately considering the variation. Specifically, the rolling may be performed by a roll press method.

In the electrode for a secondary battery produced in these processes, when the binder moves upward in the direction opposite to the direction of gravity during the electrode drying process, the electrode mixture layer obtained after drying the coated electrode slurry may have a structure in which content of the binder in a portion adjacent to the current collector is relatively greater than content of the binder in a portion apart from the current collector. Therefore, even with a small amount of binder, the adhesion between the current collector and the electrode slurry layer may be enhanced, and as a result, the overall battery performance may be improved.

The current collector and the electrode active material may be selected depending on the type of the electrode to be manufactured. Specifically, when the electrode is a positive electrode, the current collector and the active material may be a positive electrode current collector and a positive electrode active material. When the electrode is a negative electrode, the current collector and the active material may be a negative electrode current collector and a negative electrode active material.

The positive electrode current collector may be generally manufactured to a thickness of about 3 to 500 μm. For the positive electrode current collector, a material not inducing the chemical change and having a high conductivity may be used without limitation. For example, stainless steel, aluminum, nickel, titanium, calcined carbon, a surface treated material of aluminum or stainless steel with carbon, nickel, titanium, silver, or the like may be typically used. To increase the adhesiveness of the positive electrode active material, minute embossing may be formed on the surface of the positive electrode current collector. In addition, the positive electrode current collector may have various shapes such as a film, a sheet, a foil, a net, a porous body, a foamed body, a non-woven fabric, etc.

The positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O$, $LiMnO_2$, etc.; lithium copper oxide ($Li_2CuO_2$); vanadium oxide such as $LiV_3O_8$, $LiFe_3O_4$, $V_2O_5$, $Cu_zV_2O_7$, etc.; Ni site-type lithium nickel oxide represented by Chemical Formula of $LiNi_{1-x}M_xO_2$ (in which, M=Co, Mn, Al, Cu, Fe, Mg, B or Ga, x=0.01 to 0.3); lithium manganese complex oxide represented by Chemical Formula $LiMn_{2-x}M_xO_2$ (in which M=Co, Ni, Fe, Cr, Zn or Ta, and x=0.01 to 0.1) or $Li_2Mn_3MO_8$ (in which, M=Fe, Co, Ni, Cu or Zn); spinel-structured lithium manganese composite oxide represented by $LiNi_xMn_{2-x}O_4$; $LiMn_2O_4$ in which a portion of Li is substituted with alkaline earth metal ions; a disulfide compound; Fee $(MoO_4)_3$, and the like. However, the present disclosure may not be limited thereof.

The negative electrode current collector may be generally manufactured to a thickness of about 3 to 500 μm. For the negative electrode current collector, a material not inducing chemical change and having conductivity may be used without limitation. For example, copper, stainless steel, aluminum, nickel, titanium, calcined carbon, a surface treated material of copper or stainless steel with carbon, nickel, titanium, silver, an aluminum-cadmium alloy, etc. may be used. Also, to increase the adhesiveness of the negative electrode active material, minute embossing may be formed on the surface of the negative electrode current collector. The negative electrode current collector may have various shapes such as a film, a sheet, a foil, a net, a porous body, a foamed body, a non-woven fabric, etc.

The negative electrode active material may include, for example, carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 \leq x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, a titanium oxide; a lithium titanium oxide, etc.

Meanwhile, the binder contained in the electrode slurry a component assisting the bonding of the active material with the conductive material and the bonding with the current collector, and may commonly included by about 1 to 30 wt % based on the total amount of the slurry including the electrode active material. However, according to the preparing method of the present disclosure, since it is possible to exhibit sufficient adhesion even with a small amount of binder, the content of the binder may be 1 wt % to 5 wt % based on the total amount of the slurry. Typical examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

Additionally, the electrode slurry may further include a conductive material and/or a filler in addition to the active material and the binder. Generally, the conductive material may be added into a slurry including the electrode active material by 1 to 30 wt % based on the total amount of the slurry. A material not inducing chemical change and having conductivity may be used without limitation. For example, graphite such as natural graphite, synthetic graphite, etc.; carbon black such as carbon black, acetylene black, ketjen black, channel black, furnace black, lamp black, thermal black, etc.; conductive fiber such as carbon fiber, metal fiber, etc.; a metal powder such as a carbon fluoride powder, an aluminum powder, a nickel powder, etc.; conductive whisker such as zinc oxide, potassium titanate, etc.; conductive metal oxide such as titanium oxide, etc.; a conductive material such as polyphenylene derivatives, etc. may be typically used. The filler is a component restraining the expansion of the positive electrode and may be selectively used. A material not inducing chemical change and having a fiber phase may be used without limitation. For example, an olefin-based polymer such as polyethylene, polypropylene, etc.; fiber phase material such as glass fiber, carbon fiber, etc. may be used.

The present disclosure also provides a lithium secondary battery including the electrode for a secondary battery manufactured according to the above preparing method, a battery pack using the lithium secondary battery as a unit battery, and a device including the battery pack.

Specific examples of the device include a small size device such as a computer, a mobile phone, a power tool, and a medium and large size device such as a power tool powered by an electric motor; an electric vehicle including an electric vehicle (EV), a hybrid electric vehicle (HEV), a plug-in hybrid electric vehicle (PHEV), etc.; an electric motorcycle including an electric bike (E-bike) and electric scooter (E-scooter); an electric golf cart; power storage systems and etc., but the present disclosure is not limited thereto. In addition, a method of manufacturing a lithium secondary battery and a method of manufacturing a battery pack and etc. are well known in the art, so a description thereof will be omitted in the present disclosure.

As described above, in the method for preparing an electrode for a secondary battery according to the present disclosure, coating of the electrode slurry is performed on the top surface of the current collector. Additionally, the method may include a drying process while the coated current collector is inverted to face the coated surface downward with respect to the direction of gravity. Accordingly, the coating may be more easily performed and provide more uniformity of the coated surface. Additionally, the binder may flow (e.g., move) toward the collector by the drying process thereby disposing a considerable amount of binder in the vicinity of the collector, therefore, the binder exhibits sufficient adhesion even with a minimal amount, thereby improving overall performance of the secondary battery.

Hereinafter, embodiments of the present disclosure will be described with reference to the accompanying drawings. However, it is for the purpose of illustrations only, not intended to limit the scope of the present disclosure.

Figure 2:
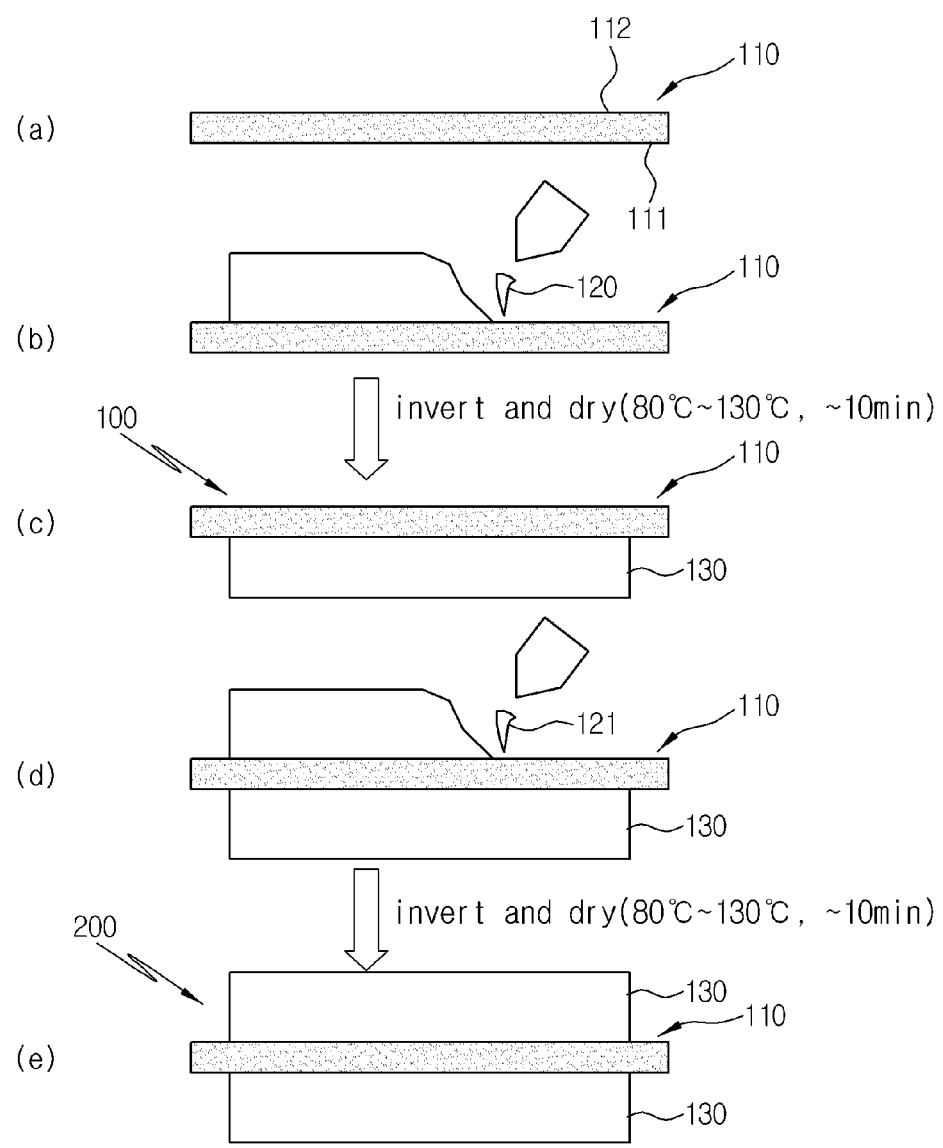
FIG. 2 is an exemplary view showing the flow of a method for preparing an electrode for a secondary battery according to an exemplary embodiment of the present disclosure.

FIG. 2 is an exemplary mimetic drawings that shows the flow of a method for preparing an electrode for a secondary battery according to an exemplary embodiment of the present disclosure. Referring to FIG. 2, a current collector (110) may be prepared (step (a)). An electrode slurry (120) including an active material (not shown) and a binder (not shown) may be coated while a first surface (112) of the current collector (110) faces upward with respect to the direction of gravity (step (b)). After the coating of the electrode slurry (120) is completed, the coated surface may be inverted to face downward with respect to the direction of gravity and may be dried at a temperature of 80 to 130° C. for 10 minutes or less to completely volatilize the solvent in the electrode slurry (120), and the electrode (100) having an electrode mixture layer (130) formed on the bottom surface of the current collector (110) may be manufactured (step (c)).

Figure 5:
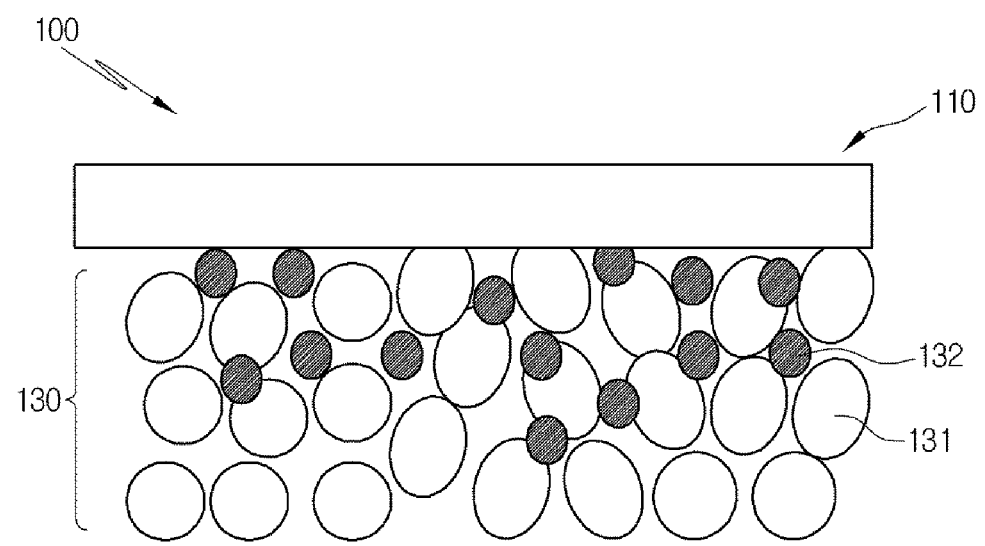
FIG. 5 is an exemplary mimetic diagram showing an electrode manufactured by the preparing method according to an exemplary embodiment of the present disclosure.

FIG. 5 shows the electrode (100) manufactured by such a process. Referring to FIG. 5, in the electrode mixture (130) including the active material (131) and the binder (132), which may be formed on the first surface of the current collector (110) and a considerable amount of binder is disposed in the vicinity of the current collector (110).

Referring to FIG. 2 again, after step (c), the electrode slurry (121) may be coated on the second surface (111) while the second surface (111) of the current collector faces upward again with respect to the direction of gravity, and the electrode mixture (130, 131) layers may be formed on both surfaces of the current collector (110). Specifically, the electrode (100) having the electrode mixture (130) layer formed on the first surface (112) of the current collector (110) may be prepared to face the second surface (111) of the current collector (110), on which the electrode mixture (130) layer is not formed, upward with respect to the direction of gravity.

The electrode slurry (121) may be coated on the second surface (111) of the current collector (110) by repeating the processes of the steps (b) and (c) (step (d)). When the coating of the electrode slurry (121) is completed, the second surface (111) may be inverted to face downward with respect to the direction of gravity and may be dried at a temperature of 80 to 130° C. for 10 minutes or less to completely volatilize the solvent in the electrode slurry (121). The electrode mixture (131) layer may also be formed on the second surface (112) of the current collector (110) to manufacture the electrode (200) having the electrode mixture (130, 131) layers formed on both surfaces of the current collector (110) (step (e)).

Figure 3:
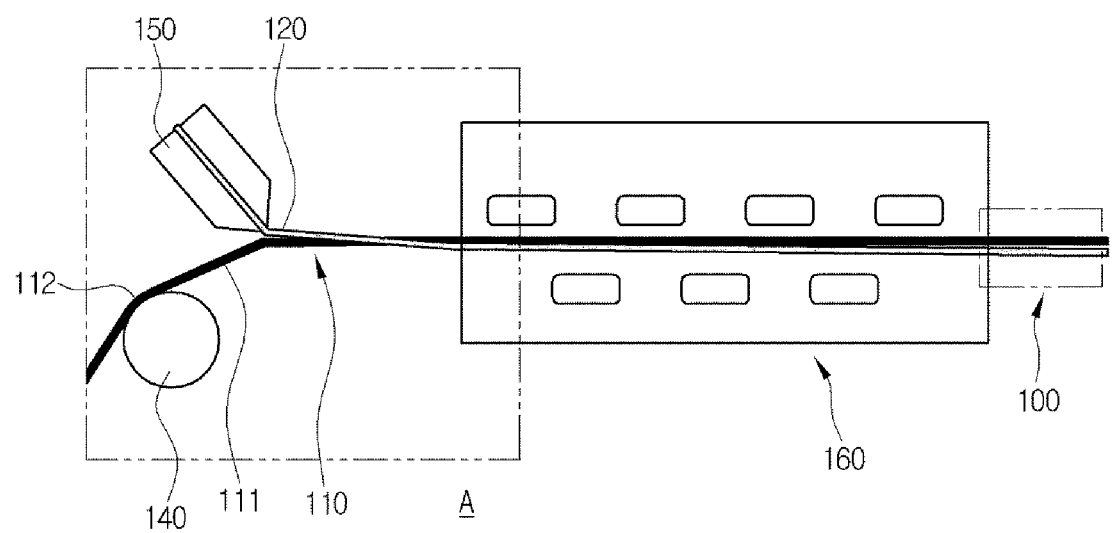
FIG. 3 is an exemplary mimetic diagram showing a method for preparing a substantial electrode for a secondary battery according to an exemplary embodiment of the present disclosure.
Figure 4:
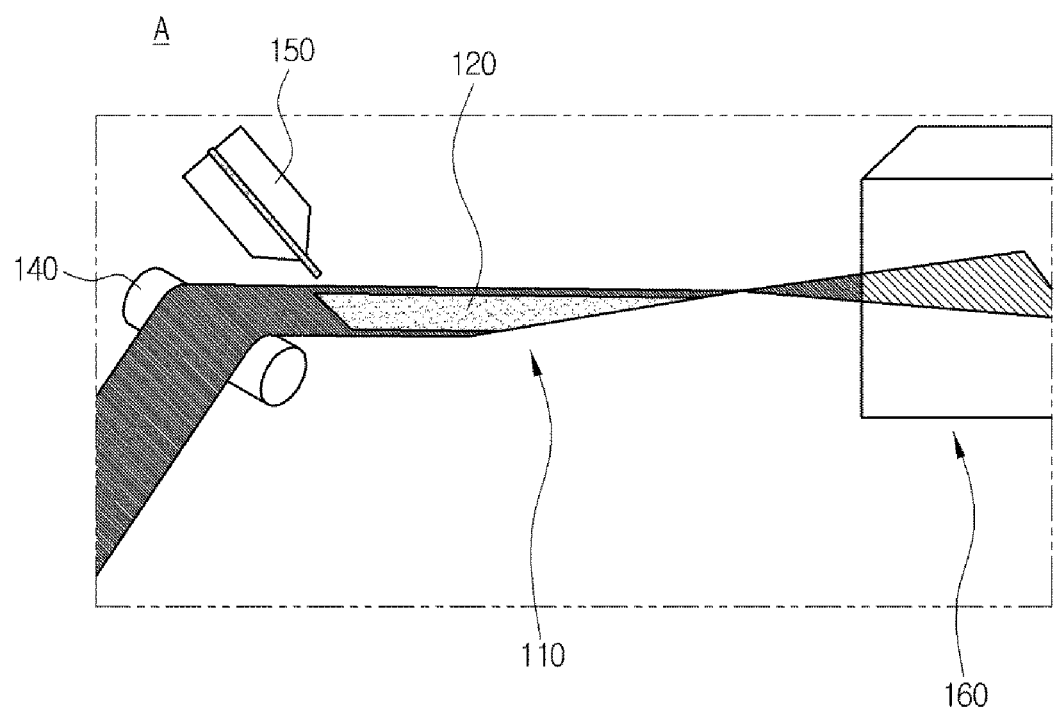
FIG. 4 is an exemplary mimetic diagram showing an enlarged view of portion A in FIG. 3 according to an exemplary embodiment of the present disclosure.

A method for preparing an electrode for a secondary battery according to an exemplary embodiment of the present disclosure which substantially shows such a preparing method is mimetically shown in FIG. 3 and FIG. 4. FIG. 4 is an exemplary enlarged view showing a process of inverting the current collector coated with electrode slurry in FIG. 3. Referring to FIGS. 3 and 4 together, the current collector (110) may be supplied while being supported by a roller (140) and in order to sequentially apply the electrode slurry (120) on the first surface (112) of the current collector (110) on the top surface of the current collector (110), the current collector may be moved by the roller (140) rotating in contact with the current collector (110), and as a coating die (150) for supplying the electrode slurry (120) is included, the electrode slurry (120) may be coated on the first surface (112) of the current collector (110) on the top surface of the current collector (110).

Referring to FIG. 4, the current collector (110) coated with the electrode slurry (120) may rotate by 180 degrees to dispose the electrode slurry (120) layer in a downward direction while moving to a dryer (160), enters the dryer (160) while being inverted to face the electrode slurry (120) layer downward with respect to the direction of gravity, passes through the dryer (160) as shown in FIG. 3, and may finally be dried to manufacture the electrode (100) according to the present disclosure. In the electrode manufactured as described above, as the binder may move upward in the drying process, an electrode structure in which a considerable amount of binder is present in the vicinity of the current collector as shown in FIG. 5 may be formed.

In particular, when the electrode slurry (120) has a viscosity of about 5,000 to 15,000 cP after rotating a Brookfield L-type viscometer for about 1 minute at a temperature of about 25° C. on condition that the rotor number is 64 and the rotational speed is 12 rpm. Accordingly, since the electrode slurry is consecutively coated and dried in a period of about 20 seconds or less between the time point of inverting the electrode slurry (120) to face downward with respect to the direction of gravity and the time point of beginning the drying, flow from the electrode slurry is prevented even through the electrode slurry is dried while being positioned on the bottom surface.

Hereinafter, the present disclosure will be explained in detail with reference to exemplary embodiments. However, the embodiments of the present disclosure are provided to more fully explain the present disclosure, and they should not be interpreted as limiting the scope of the present disclosure.

EXAMPLES

Example 1

A positive electrode active material of $Li(Ni_{1/3}Mn_{1/3}Co_{1/3})O_2$, a conductive material of Denka black and a binder of polyvinylidene fluoride of a weight ratio of 96:2:2 are mixed with NMP (Nmethylpyrrolidone) to prepare slurry. The slurry is coated on the top surface of an Al foil having a thickness of 20 μm in the same manner as in steps (a) to (c) of FIG. 2 and in FIG. 3, and this is inverted and dried at 120° C. for 5 minutes to prepare a positive electrode.

Comparative Example 1

A slurry prepared in the same manner as in Example 1 is coated on the cross section applying on the top surface of the Al foil having a thickness of 20 μm, and this is dried at 120° C. for 5 minutes to prepare a positive electrode.

Experimental Example 1

A pole plate of the positive electrode prepared in Example 1 and Comparative Example 1 is cut in a predetermined size and fixed on a slide glass. Then, the current collector is peeled off, and 180-degree peel strength is measured. The results are shown below in Table 1.

TABLE 1

|  | Example 1 | Comparative Example 1 |
| --- | --- | --- |
| Adhesion (gf/10 mm) | 130 | 10 |

In Table 1, first, referring to Example 1 and Comparative Example 1, it may be confirmed that the adhesion of Example 1 is greater than that of Comparative Example 1.

Experimental Example 2

A monocell is prepared by using the positive electrode of Example 1 and Comparative Example 1, a negative electrode manufactured by coating, drying and rolling a slurry which is prepared by mixing graphite as a negative electrode active material, a conductive material of Denka black and a binder of polyvinylidene fluoride at a weight ratio of 96:2:2 on an aluminum current collector, and electrolyte containing 1M of LiPF6 in a solvent of EC:EMC=3:7. The monocell is charged and discharged (2.5V) for 100 cycles in a 1 C CC/CV mode of an upper limit voltage of 4.25V at room temperature of 25° C., and a capacity maintenance rate is measured. The results are shown in Table 2.

TABLE 2

|  | Example 1 | Comparative Example 1 |
| --- | --- | --- |
| Initial discharge capacity (mAh/g) | 153.2 | 154.0 |
| Capacity maintenance rate | 98.1 | 97.5 |

Referring to Table 2, the lifespan characteristic is also improved when the adhesion is greater.

Although the exemplary embodiments of the present disclosure have been described, it will be understood by those skilled in the art that the present disclosure should not be limited to these exemplary embodiments but that various changes and modifications may be made therein without departing from the spirit and scope of the disclosure.

The invention claimed is:

1. A method for preparing an electrode for a secondary battery, comprising:
preparing an electrode slurry including an electrode active material and a binder;
producing a pre-electrode by coating a first surface of a plurality of surfaces of a current collector with the electrode slurry while the first surface is disposed in an upward direction; and
drying the pre-electrode while the electrode slurry coated on the first surface of the current collector is inverted to be disposed in a downward direction,
wherein, during the drying the pre-electrode, the electrode active material and the binder are separated within the coated electrode slurry and the binder moves upwardly toward the current collector such that content of the binder in a portion adjacent to the current collector is greater than content of the binder in a portion apart from the current collector.

2. The method for preparing an electrode for a secondary battery according to claim 1, comprising:
coating the electrode slurry on a second surface of the current collector while the electrode in which the electrode slurry coating layer is formed on first surface of the current collector is inverted to face the second surface of the current collector disposed in the upward direction; and
drying the electrode while the electrode slurry coated on the second surface of the current collector is inverted to be disposed in the downward direction.

3. The method for preparing an electrode for a secondary battery according to claim 1, wherein the electrode slurry has a viscosity of about 5000 to 15000 cP after rotating a Brookfield L-type viscometer for about 1 minute at a temperature of about 25° C. on condition that a rotor number is 64 and a rotational speed is 12 rpm.

4. The method for preparing an electrode for a secondary battery according to claim 1, wherein the coating is performed by selecting any one from a group consisting of a die coating method, a slide-slot die coating method, a gravure coating method, a roll coating method, an electrospinning or spraying method and a combination thereof.

5. The method for preparing an electrode for a secondary battery according to claim 1, wherein producing a pre-electrode and drying the pre-electrode are performed consecutively.

6. The method for preparing an electrode for a secondary battery according to claim 1, wherein, drying the pre-electrode includes a time interval between a time point of inverting the electrode slurry coated on the first surface of the current collector disposed in the downward direction and a time point of beginning the drying is 20 seconds or less.

7. The method for preparing an electrode for a secondary battery according to claim 2, wherein, drying the electrode includes a time interval between a time point of inverting the electrode slurry coated on the second surface of the current collector disposed in the downward direction and a time point of beginning the drying is 20 seconds or less.

8. The method for preparing an electrode for a secondary battery according to claim 1, wherein the drying is performed at a temperature in a range of about 80 to 130° C. for approximately 10 minutes or less.

9. The method for preparing an electrode for a secondary battery according to claim 1, further comprising a rolling process after drying the pre-electrode.

10. The method for preparing an electrode for a secondary battery according to claim 2, wherein coating the electrode slurry and drying the electrode are performed consecutively.

11. The method for preparing an electrode for a secondary battery according to claim 2, further comprising a rolling process after drying the electrode.

* * * * *